April 21, 1925.　　　　　J. ROBSON　　　　　1,534,544
VEHICLE BRAKE
Filed May 25, 1923　　　4 Sheets-Sheet 1
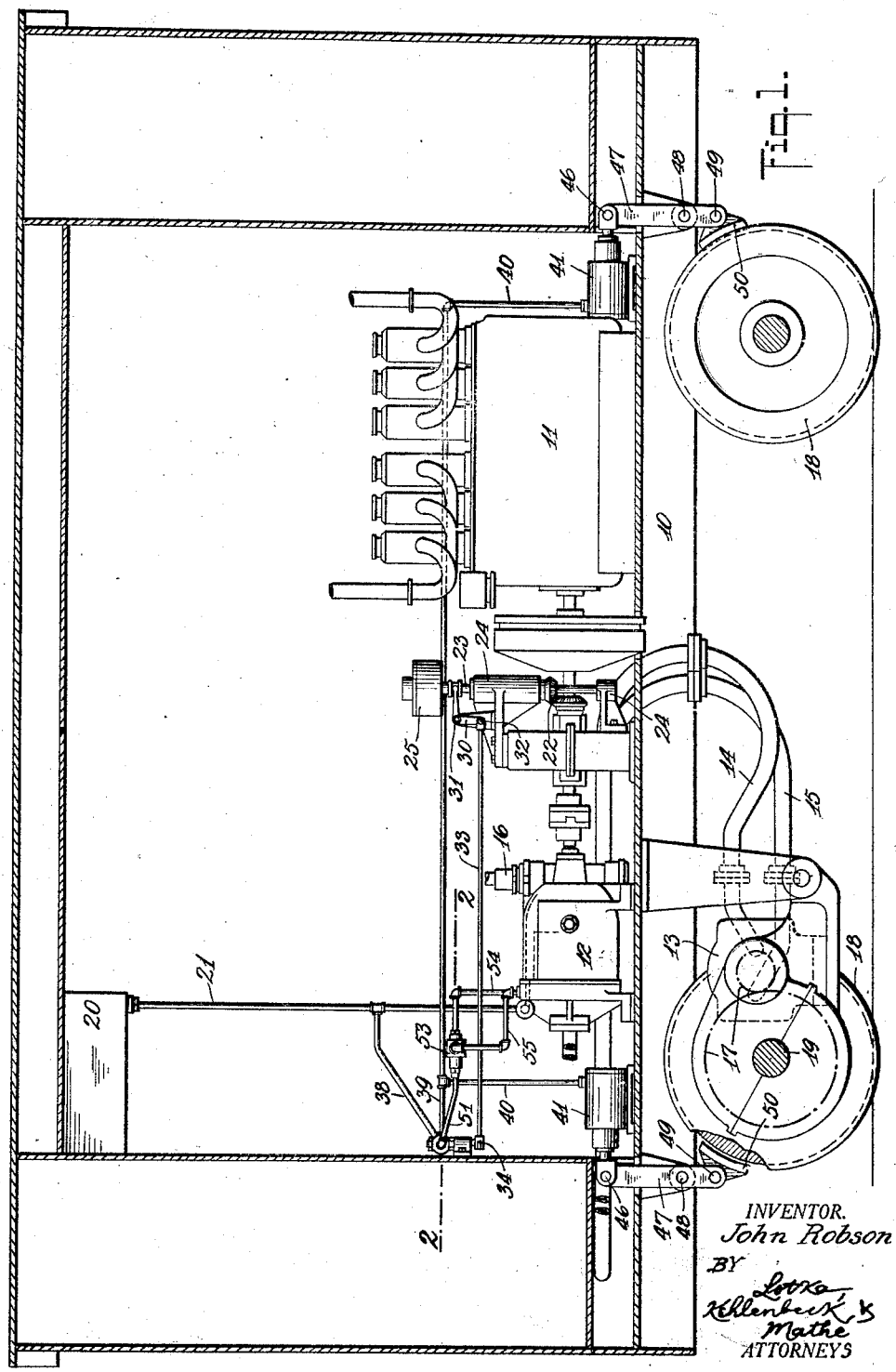
INVENTOR.
John Robson
BY
ATTORNEYS

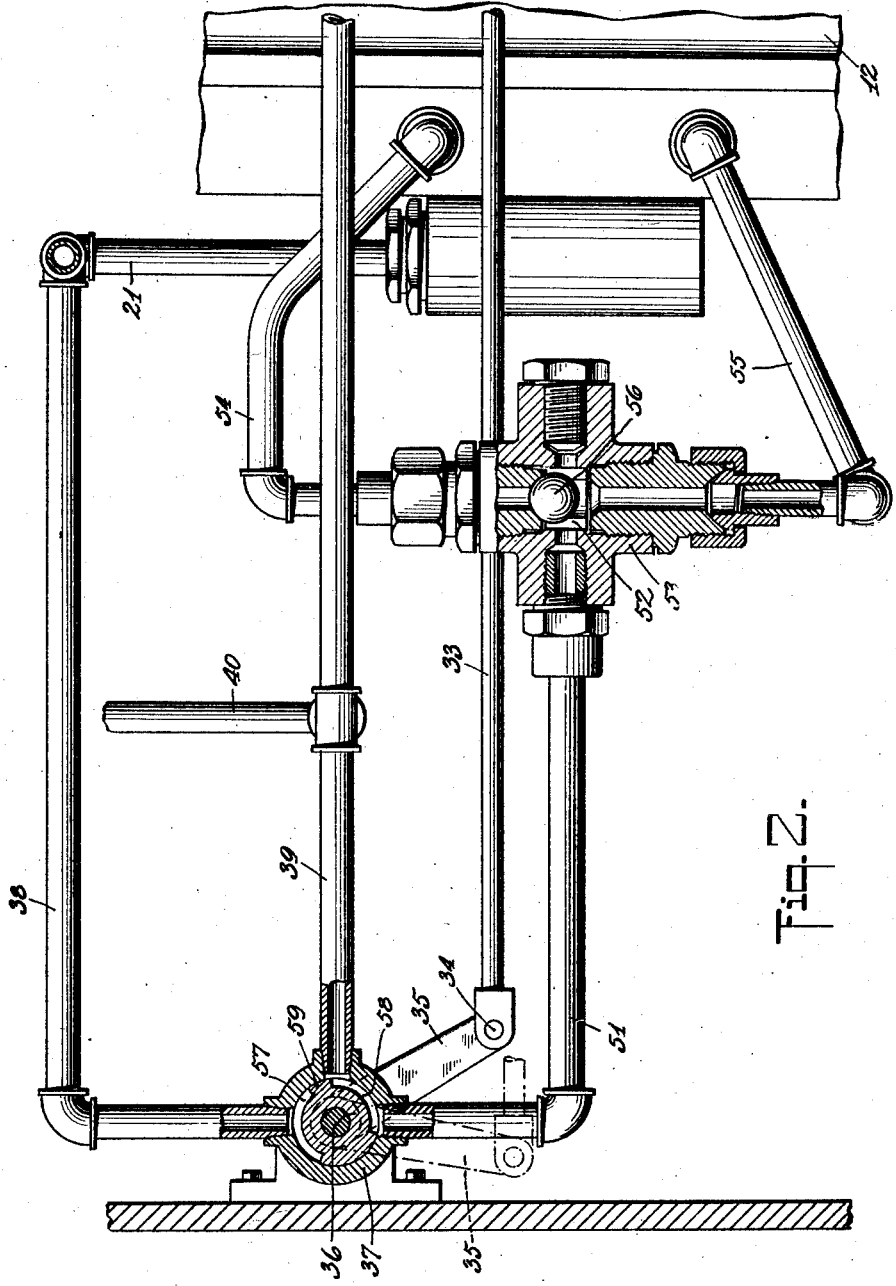

April 21, 1925.
J. ROBSON
1,534,544
VEHICLE BRAKE
Filed May 25, 1923
4 Sheets-Sheet 3
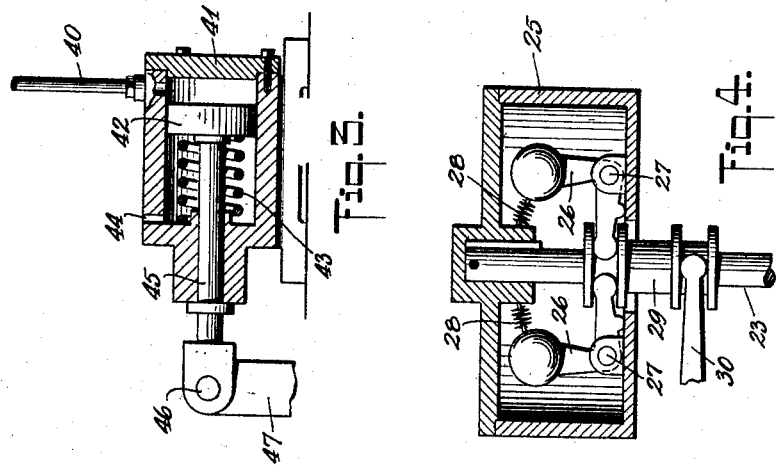
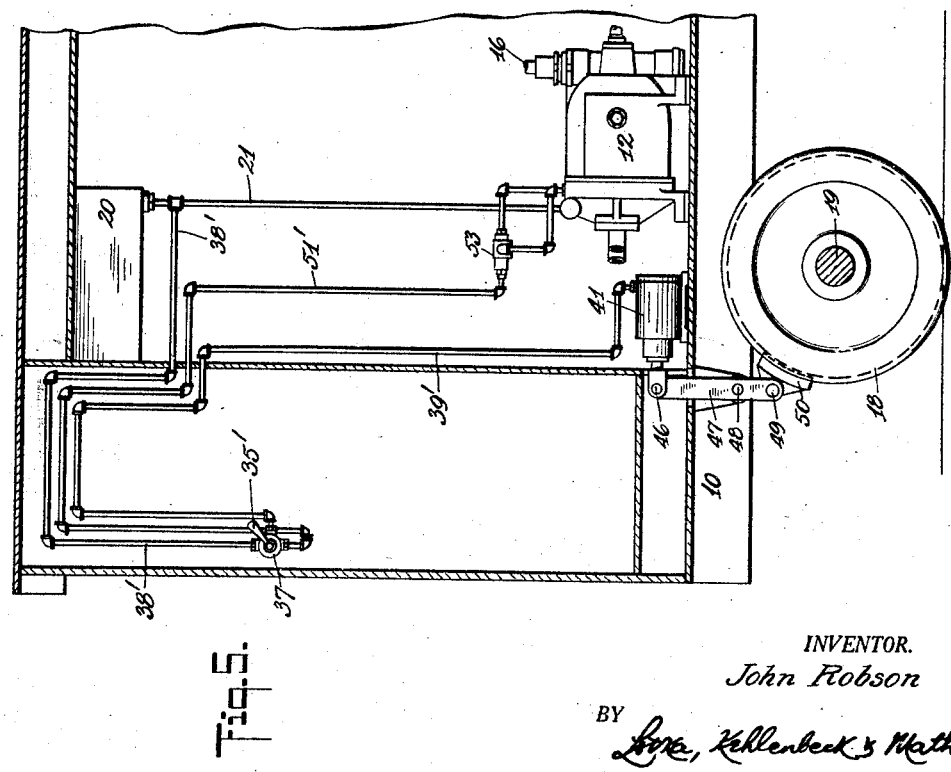
INVENTOR.
John Robson
BY
ATTORNEYS.

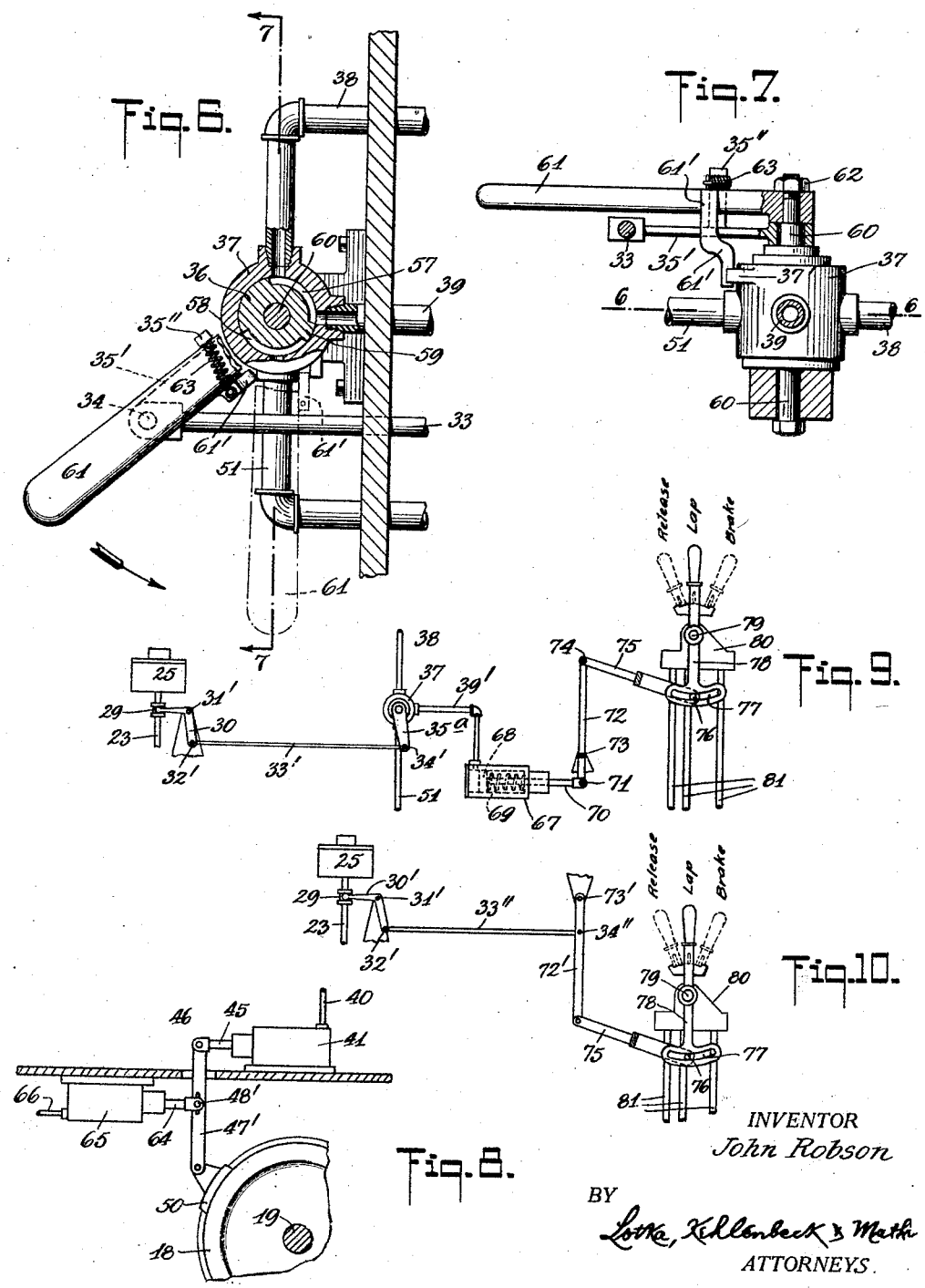

Patented Apr. 21, 1925.

1,534,544

UNITED STATES PATENT OFFICE.

JOHN ROBSON, OF WATERBURY, CONNECTICUT, ASSIGNOR TO UNIVERSAL ENGINEERING CORPORATION, OF MONTREAL, QUEBEC, CANADA, A CORPORATION OF CANADA.

VEHICLE BRAKE.

Application filed May 25, 1923. Serial No. 641,337.

*To all whom it may concern:*

Be it known that I, JOHN ROBSON, a subject of the King of Great Britain, and a resident of Waterbury, in the county of New Haven and State of Connecticut, have invented certain new and useful Improvements in Vehicle Brakes, of which the following is a specification.

My invention relates to brakes for vehicles, and particularly for vehicles carrying an engine or power plant, especially of the character in which a liquid is used to transmit power to the wheels of the vehicle. The object of my present invention is to utilize the pressure of such power-transmitting liquid for the purpose of applying the brake.

Satisfactory examples of this invention will now be described in detail with reference to the accompanying drawings, in which Fig. 1 is a longitudinal vertical section through a locomotive provided with a brake embodying my invention and arranged to operate automatically whenever the speed of the engine exceeds a predetermined limit; Fig. 2 is a plan view of a portion of the brake mechanism, on an enlarged scale, and with parts in section on line 2—2 of Fig. 1; Fig. 3 is a vertical section through the brake cylinder shown in Fig. 1; Fig. 4 is an elevation, with parts in section, of the brake-controlling governor shown in Fig. 1; Fig. 5 is a partial longitudinal section of a locomotive having a brake system similar to that in Fig. 1, but operated by the engineer instead of automatically; Fig. 6 is a partial horizontal section, on line 6—6 of Fig. 7, showing still another form of my invention; Fig. 7 is a vertical section substantially on line 7—7 of Fig. 6; and Figs. 8, 9, and 10 are diagrammatic elevations of three further embodiments of my present invention.

In the example illustrated by Figs. 1 to 4, the invention is applied to a locomotive having a suitable frame 10 supporting the internal combustion engine 11 which through suitable intermediate mechanism drives a pump contained in the casing 12. The liquid (generally oil) propelled by such pump operates a motor 13, or a plurality of such motors, pipes 14 and 15 respectively conveying the fluid from the pump to the motor and back from the motor to the pump. The driving mechanism itself forms no part of my present invention, and is practically the same as shown in my pending application for Letters Patent of the United States, Serial No. 584,944 filed August 29, 1922. The pump contained in the casing 12 is of a type now well-known in the art, and a disclosure of such pump is found in my earlier application just referred to, and also in several patents, for instance Harvey D. Williams' United States Patents No. 925,148 of June 15, 1909 and No. 1,044,838 of November 19, 1912. For speed-regulating purposes, the output of the pump may be varied by mechanism a portion of which has been indicated at 16, such speed-varying mechanism being likewise disclosed in the earlier application and in the patent mentioned above. It will be understood that the pump has two ports, one connected with the pipe 14 and the other with the pipe 15, and according to the direction in which the oil travels through the circuit (which direction is reversible by means of the mechanism 16), one or the other of these pump ports is the pressure port, the other being the suction port. In Fig. 1, I have indicated gearing 17 by which the motor 13 drives the wheel 18 on the axle 19. An expansion tank 20 is connected by a pipe 21 with the interior of the pump casing 12.

According to the example of my present invention illustrated by Figs. 1 to 4, the shaft of the engine 11 is connected in any suitable manner, for instance by gearing 22, driven by the mechanism transmitting power from the engine to the pump, with a governor shaft 23 journalled in suitable bearings 24. The existing engine governor may be utilized. To the upper end of this shaft is secured rigidly a casing or carrier 25 to which the ball-carrying levers 26 are pivoted at 27 to swing in axial planes. Springs 28, attached to the carrier and to the balls, tend to pull the latter toward the axis of rotation. On said shaft 23 is mounted to slide lengthwise a sleeve 29 having an upper collar or groove to co-operate with the corresponding ends of the ball-carrying levers 26, and a lower collar or groove co-operating with one end of an elbow lever 30 fulcrumed at 31, the other end of the lever being pivotally connected at 32 with a link or rod 33. The other end of this rod has a pivotal connection at 34 with an arm 35 rigid with the plug 36 of the brake-controlling valve. The casing 37 of this valve has three ports, from one of which a pipe 38 leads to the expansion tank 20, by way of the pipe 21. The second port, located between the other two, is connected by pipes 39 and 40 with brake cylinders 41 (here shown as located at both ends of the locomotive) in which are fitted to slide pistons 42 pressed by springs 43 toward the end at which the pipes 40 are connected. A vent 44 is provided at the other end of each cylinder 41. The pistons 42 are connected by rods 45 and pivots 46 with levers 47 fulcrumed at 48 and carrying pivotally at 49, brake shoes 50 adapted for engagement with the respective wheels 18. The third port of the valve casing 37 is connected with the pressure port of the pump casing 12, by a pipe 51. Should the oil always flow in the same direction through the pump and motor circuit, the pressure port of the casing 12 would always be the same, and a simple pipe connection would suffice. Generally, however, the direction of flow is reversible, so that one port of the casing or the other may be the pressure port. In view of this, the pipe 51 is not connected directly with a port of the pump casing 12, but with the central chamber 52 of a casing 53, the latter having two additional ports connected by pipes 54, 55, respectively with the two ports of the pump casing 12. The connection of said chamber 52 with the pipes 54, 55 is controlled automatically by a valve 56 in such a manner that such valve shuts off from the chamber 52 the pipe 54 or 55 leading to that port of the pump casing 12 which is the suction port. The pipe 51 is therefore always connected with the pressure port of the pump casing 12. In Fig. 2, it has been assumed that the port of the casing 12 to which the pipe 54 leads is the suction port; should the function of the ports be reversed (as it is when the oil flows in the opposite direction through the pump-motor circuit) the pipe 54 will contain oil under pressure, and the valve 56 will be shifted by such pressure, and by the suction then existing in pipe 55, to its other position, in which it closes communication between the chamber 52 and the pipe 55.

The valve plug 36 has two ports or channels 57 and 58, separated by a rib 59, and in permanent communication with the pipes 38 and 51 respectively. Normally, that is to say, with the brakes released, the arm 35 is in the position indicated by the dotted lines in Fig. 2, so that the pipe 39 leading to the brake cylinders 41 is in communication with the pipe 38 leading to the expansion tank 20, and the springs 43 press the pistons 42 back to the brake-releasing position, the oil in the cylinders being forced through pipes 40, 39, channel 57 and pipes 38, 21 into the expansion tank. If, however, the engine should race, the action of the centrifugal governor will shift the valve plug 36 to the position shown in full lines in Fig. 2, so that oil under pressure will pass from pipe 51 through the channel 58 into pipes 39 and 40, thus reaching the brake cylinders 41 and operating the pistons 42 to apply the brakes 50. As soon as the engine speed drops to the proper figure, the governor will restore the plug 36 to the original position and thus release the brakes. It will thus be seen that the centrifugal governor is automatic both as to causing the application of the brakes and as to effecting their release. While I have shown the control of brakes located at both ends of the locomotive, I do not wish to restrict myself to this feature, nor is it necessary that the brakes should work on supporting wheels of the locomotive or other vehicle, it being obvious that such brakes might act on any other rotary part of the mechanism, for instance on the fly-wheel of the engine.

In Fig. 5 I have shown a form of my invention in which the brake-controlling valve is operated by the engineer instead of automatically. The centrifugal governor and its connections are omitted, but the general arrangement of the other parts is substantially the same as described above. The interior construction of the casing 37 and plug 36 is the same as before, but the arm 35′ rigid with the plug simply constitutes a handle for operation by the engineer. The pressure pipe 51′, relief pipe 38′ and brake cylinder pipe 39′ correspond in function to the similarly designated parts described in connection with Figs. 1 to 4. The handle 35′ will be normally in the brake-releasing position, in which the pipe 39′ communicates with the pipe 38′. To apply the brake, the engineer will swing the handle 35′ to the other position, thus bringing the pipe 39′ in communication with the pressure pipe 51′, and causing the brake to be applied in the same manner as described above.

In Figs. 6 and 7 I have illustrated a construction operating automatically in the same manner as explained with reference to Figs. 1 to 4, and also permitting of independent manual operation. It is to be understood that the parts at the right of those shown in Fig. 6, are to be of the same construction as illustrated in Figs. 1 and 2, that is to say, the right hand end of the rod 33 is connected with the elbow lever 30 controlled by the governor. The left-hand end of rod 33 is pivotally connected at 34 with an arm 35′ which (instead of being held to turn with the valve plug 36, as in Fig. 2) is mounted loosely on the shaft or spindle 60 to which the valve plug 36 is secured in such a manner that plug and spindle will turn in unison. The details of the plug 36, casing 37, their ports, and their connections, are the same as first described. The arm 35' is provided with a projection 35" adapted to engage a hand lever 61 held to turn with the plug 36 and spindle 60, for instance by being secured to the latter by a nut 62. A spring 63, having one end fastened to the said projection 35" (or to any other suitable part of the arm 35'), and its other end secured to the lever 61, tends to keep the latter in contact with said projection 35", as indicated by full lines in Fig. 6, yet allows the lever 61 to be swung manually away from said projection, say to the position indicated by dotted lines in Fig. 6. The governor-controlled operation of this form of my invention is exactly as first described, since the spring 63 will normally keep the lever 61 against the projection 35" and thus compel said lever (and the valve plug 36) to swing in unison with the governor-actuated arm 35'. The full lines in Fig. 6 show the plug 36 and connected parts in the brake-release position in which the pipes 38 and 39 are in communication with each other. Should it be desired to apply the brakes by manual operation at a time when the governor is holding the arm 35' in the position shown in Fig. 6 (release position), the engineer will swing the lever 61 in the direction indicated by the arrow, the spring 63 yielding to allow the said lever to move independently of the arm 35', which latter remains stationary. Since the plug 36 is held to turn in unison with the lever 61, this manual operation will bring the plug 36 to the brake-applying position in which the pipe 39 communicates with the pipe 51, as illustrated in Fig. 2. As soon as the engineer releases the lever 61, the spring 63 will bring said lever back to contact with the projection 35", so that the arm 35' and lever 61 (with the valve plug 36) will again move in unison, under the automatic control of the governor. Should the arm 35' and the lever 61 be brought, by the action of the governor, to the brake-applying position in which the lever 61 stands as indicated by the dotted lines in Fig. 6 (and the plug 36 in the position Fig. 2), the engineer might, unless special provision is made to prevent this, bring the plug 36 to the release position by swinging the lever 61 toward the right, from the position indicated by dotted lines in Fig. 6. Inasmuch as it is not desirable that the engineer should be able to release the brake manually when it has been applied automatically by the action of the governor, suitable means may be employed to prevent this; for instance, the lever 61 may be provided with a projection 61' adapted to engage a stationary stop 37' when said lever has reached the brake-applying position.

In Fig. 8 I have illustrated an arrangement for applying the brake either by the oil-pressure device such as described above, particularly with reference to Figs. 1 to 5 (but applicable as well in connection with the features illustrated by Figs. 6 and 7), or by air-pressure in connection with mechanism of the kind customarily used with air-brakes. The showing in Fig. 8 may be taken as illustrating the parts illustrated at the left-hand lower portion of Figs. 1 and 5, the parts 18, 19, 40, 41, 45, 46, and 50 being exactly or substantially the same as before described. The lever 47', however, is not mounted on a stationary fulcrum, but on a movable fulcrum 48' formed at the end of the rod 64 extending from the usual piston (not shown) contained in the brake-cylinder 65 to which compressed air is supplied through a pipe 66, controlled in any well-known or approved manner. The lever 47' thus becomes a floating lever. As long as the air-brake is inactive, the fulcrum 48' will remain stationary, and the device will operate exactly as described in connection with Figs. 1 to 5. If the air-brake operation is performed, the rod 45 remaining stationary, the pivotal connection 46 will temporarily form a fixed fulcrum for the lever 47', and the brake 50 will be applied by the swinging of said lever 47' on said fulcrum 46. It will be noted that the rods 45 and 64 move in opposite directions during their active strokes, so as to insure the movement of the brake shoe 50 in the proper direction.

In Figs. 9 and 10 I have shown two additional ways of operating air-brakes both automatically and manually in accordance with my invention. In both of these constructions, a governor of the character above set forth is employed for the automatic operation of the air-brake; in Fig. 9, the governor operates the air-brake mechanism through the medium of the oil-pressure, while in Fig. 10 there is a direct mechanical connection between the governor and the air-brake mechanism. In each of these views, 25 designates the governor with its shaft 23, 29 the governor-actuated sleeve on said shaft, and 30' the elbow lever fulcrumed at 31' and having one end in engagement with said sleeve, while the other end has a pivotal connection 32', all as hereinabove set forth.

In Fig. 9 the rod 33' attached to the lever 30' at 32' connects with an arm 35ᵃ connected to turn with a plug in the valve casing 37, said plug being of the same character as described with reference to Fig. 2, and controlling three connections 38, 39', and 51, of the same character as the connections 38, 39, and 51 of Figs. 2 and 6, except that the connection 39' leads to a cylinder 67 containing a piston 68 moved toward the oil inlet by a spring 69. The piston rod 70 is pivotally connected at 71 with a lever 72 swinging on a stationary fulcrum 73 and pivotally connected at 74 with a (forked) arm 75 provided with a pin 76. This pin is fitted to move within a segmental guide or slot 77 on a lever 78 fulcrumed at 79 on the casing 80 containing the usual engineer's valve forming part of the air-brake equipment, or any equivalent controlling device. The position indicated by full lines is the neutral or so-called "lap" position, while the left-hand position indicated by dotted lines is the "release" position of the engineer's valve, and the right-hand position indicated by dotted lines is the "brake" or brake-applying position of the lever 78, effecting the customary operations in any well-known or approved manner, to apply or release the air-brake; the numeral 81 indicates the customary air-pipes controlled by the engineer's valve. The segmental guide or slot 77 is long enough to enable the lever 78 to be moved by hand to the brake-applying position without affecting the pin 76 and arm 75, that is to say, without taking along the parts that always move in unison with the governor sleeve 29. In the case of excessive engine speed, the brake will be applied automatically through the action of the governor sleeve on the parts 30′, 33′, 35ª, causing the plug in the valve casing 37 to be turned in such a manner as to admit oil under pressure from the pipe 51 to the pipe 39′ and thus to the cylinder 67, operating the piston 68 and lever 72 in such a manner that the pin 76 will be drawn against the left-hand end of the slot or guide 77, whereupon the lever 78 will move in unison with the arm 75, to the brake-applying position. With this construction (as also with the one illustrated by Fig. 10) the return of the governor to the position corresponding to normal speed, will not change the position of the lever 78 from the brake-applying position, so that manual operation will be necessary to bring the lever to the neutral ("lap") or to the "release" position. Of course, normally the pressure pipe 51 will not be in communication with the pipe 39′ leading to the cylinder 67.

In Fig. 10, the rod 33″ connects the elbow lever 30′ directly, at 34″, with a lever 72′ fulcrumed at 73′ and connected with the arm 75 in the same manner as in Fig. 9, the connection with the engineer's valve being also as in Fig. 9, and the operation being equivalent to that explained in connection with Fig. 9, so that a detailed description will not be necessary.

I claim:

1. In a power-propelled vehicle, a power plant of the type in which a liquid under pressure is used to transmit power to the vehicle drive, a governor operatively connected with said power plant, and a brake controlled by said governor to be applied automatically whenever the speed of the power plant exceeds a predetermined limit.

2. In a power-propelled vehicle, a power plant of the type in which a liquid under pressure is used to transmit power to the vehicle drive, a governor operatively connected with said power plant, brake mechanism, and a connection, controlled by said governor, for admitting said liquid under pressure to said brake mechanism to cause it to become operative when the speed of the power plant exceeds a predetermined limit.

3. In a power-propelled vehicle, a power plant of the type comprising a pump, means for driving it, and a motor driven by the liquid propelled by said pump, brake mechanism, a connection for admitting said liquid under pressure to the brake mechanism to cause its operation, and means, under the control of the operator, for controlling said connection.

4. In a power-propelled vehicle, a power plant of the type comprising an engine, a pump driven by said engine, and a motor driven by the liquid propelled by said pump, a centrifugal governor operatively connected with said engine, brake mechanism, and a connection, controlled by said governor, for admitting said liquid under pressure to said brake mechanism to cause its operation whenever the engine speed exceeds a predetermined limit.

5. In a power-propelled vehicle, a power plant of the type comprising a pump casing, a pump therein, an expansion tank connected with said casing, means for driving said pump, a motor driven by the liquid propelled by said pump, brake mechanism, and valve mechanism controlling said brake mechanism, said valve mechanism comprising a casing having three connections, one leading to the pressure or delivery port of the pump, another to the expansion tank, and the third to the brake mechanism, and a valve member movable within said casing and adapted, according to its position, to connect the brake mechanism connection of the valve casing either with the expansion tank, to release the brake, or with the pressure connection, to apply the brake.

6. In a power-propelled vehicle, a power plant of the type comprising a pump, means for driving it, a motor driven by the liquid propelled by said pump, brake mechanism, and valve mechanism controlling said brake mechanism, said valve mechanism comprising a casing having three ports, one of them a relief port, another communicating with the pressure or delivery port of the pump, and the third with the brake mechanism, and a valve member movable in said casing and adapted, according to its position, to connect the said third port either with the relief port or with the port communicating with the pressure port of the pump.

7. In a power-propelled vehicle, a power plant of the type comprising a pump, means for driving it, a motor driven by the liquid propelled by said pump, brake mechanism, and valve mechanism controlling said brake mechanism, said valve mechanism comprising a casing having three ports, a tank connected with one of said ports, a connection from the second port to the pressure or delivery port of the pump, and a connection from the third port to said brake mechanism, and a valve member movable in said casing and adapted, according to its position, to connect said third port either with said tank or with the pressure port of the pump.

8. In a power-propelled vehicle, a power plant of the type comprising an engine, a pump driven by said engine and adjustable so that either of its ports may serve as a suction port or as a delivery port, a motor driven by the liquid propelled by said pump and having connections to receive liquid under pressure from one of said pump ports and to return liquid to the other pump port, brake mechanism, and valve mechanism comprising a casing having three ports, one of them a relief port, a connection from the second port to the brake mechanism, a connection from the third port to both ports of the pump, a valve located in said last-named connection to establish automatically a connection between said third port and only that pump port which at the time is the pressure or delivery port, and a valve member movable in said casing and adapted, according to its position, to connect said second port of the valve casing either with the relief port or with the pressure port of the pump.

9. In a power-propelled vehicle, a power plant of the type comprising an engine, a pump driven by said engine, a motor driving the vehicle and actuated by the fluid propelled by said pump, a brake adapted to be operated by the pressure of such fluid, and air mechanism for operating the same brake.

10. In a power-propelled vehicle, a power plant of the type comprising an engine, a pump driven by said engine, a motor driving the vehicle and actuated by the fluid propelled by said pump, a brake adapted to be operated automatically by the pressure of said fluid, and manually-operated means for actuating said brake independently of such automatic means.

11. In a power-propelled vehicle, a power plant of the type comprising an engine, a pump driven by said engine, a motor driving the vehicle and actuated by the fluid propelled by said pump, a governor connected with said engine, a brake operated by said governor automatically, and manually-controlled mechanism for operating said brake independently of the governor.

12. In a power-propelled vehicle, a power plant for driving said vehicle, said power-plant including a governor, a brake operated by said governor automatically, and manually-controlled mechanism for operating said brake independently of the governor.

In testimony whereof I have signed this specification.

JOHN ROBSON.